Dec. 5, 1961  R. J. MEHAFFEY  3,011,950
LIQUID COMPOSITION CONTAINING DISCRETE GASEOUS BODIES
Filed May 19, 1959  2 Sheets-Sheet 1

INVENTOR.
ROBERT JAMES MEHAFFEY
BY
*Murray M. Grill*
ATTORNEY

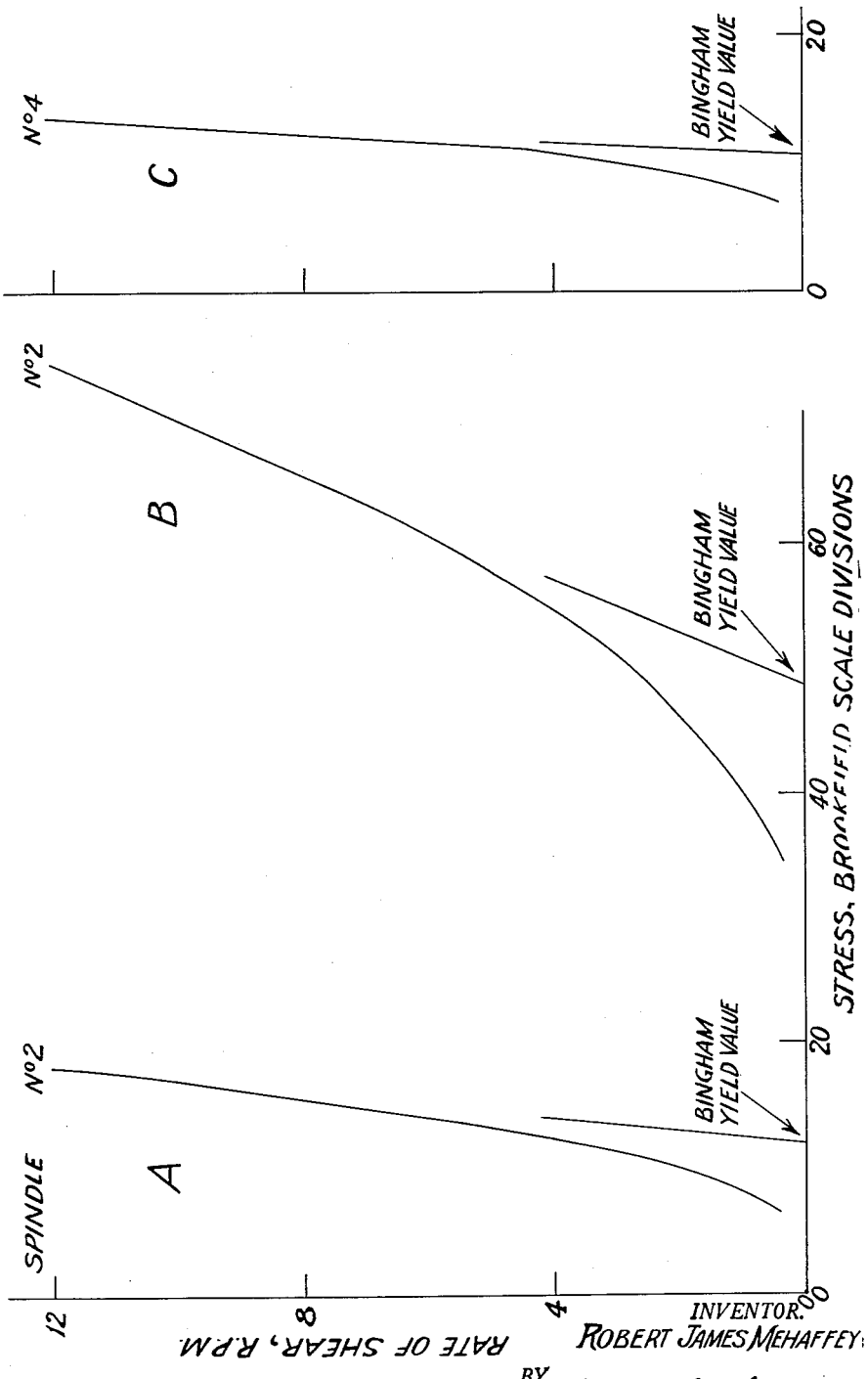

United States Patent Office 3,011,950
Patented Dec. 5, 1961

3,011,950
LIQUID COMPOSITION CONTAINING DISCRETE
GASEOUS BODIES
Robert James Mehaffey, River Edge, N.J., assignor to Colgate-Palmolive Company, New York, N.Y., a corporation of Delaware
Filed May 19, 1959, Ser. No. 814,283
18 Claims. (Cl. 167—85)

The present invention relates to a pourable liquid product, and method for manufacture of same, which comprises a liquid phase and a dispersion of discrete, globular gaseous bodies which remain substantially suspended therein upon aging and impart a characteristic optical effect, such as a sparkling appearance, as hereinafter described and claimed.

More particularly, it relates to a liquid composition, such as a cosmetic product, comprising a polar solvent containing a polymer dissolved therein in such concentration as to be pourable and form a liquid phase having a Bingham yield value. There are dispersed therein discrete, macroscopically globular gaseous bodies which normally exert a buoyant effect tending to make them rise in a liquid, and the yield value of said liquid is controlled so as to maintain said gaseous bodies in suspension in the liquid upon aging.

In general, the gaseous bodies have diameters of a desired size range within the limits of about 0.1 to 8 millimeters, more particularly from about 0.5 to 5 millimeters, the average number of bodies being at least about one per cubic centimeter of the liquid and distributed as to impart the desired optical effect upon visual observation. The flow properties of the liquid, which include the yield strength, are such as to permit the gaseous bodies to maintain the globular form and retain them in suspension for a prolonged period of time, and to allow the draining of the liquid from the walls in a smooth, oily manner upon pouring of the product.

A particular embodiment of the invention relates to a cosmetic lotion in the form of a transparent liquid wherein said gaseous bodies are of sufficient size and distributed in large number throughout a clear liquid phase as to impart a sparkling optical effect.

Figure 2:
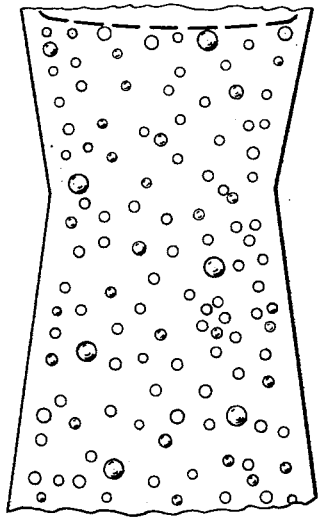
Figure 1:
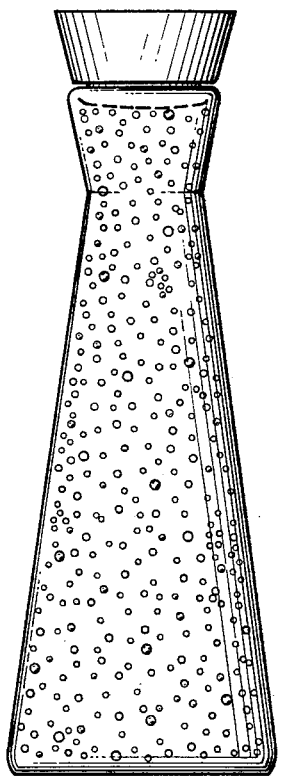

In order to more fully illustrate the present invention, reference will be made to the accompanying drawings. FIGURE 1 is an elevation view in approximately full scale showing a typical product in a narrow-mouthed container and FIGURE 2 is an enlarged section (about 2x) thereof. The composition comprises a dispersion of discrete, substantially globular bodies throughout the liquid. These gas bodies are sufficiently large to be transparent and permit the perceptible transmission of light through the individual gaseous bodies and to perceptibly reflect light from the skin or curved surfaces of the liquid surrounding the gas bodies, resulting in a sparkling effect when held by an observer before a light. FIGURE 3 sets forth in series of flow curves of the cosmetic lotions as described hereinafter. Various other preferred embodiments will be apparent in the following description.

The characteristic appearance of the product is effected by a number of factors which are properly selected and integrated to provide the product hereinafter claimed. Among these factors are the composition of the liquid phase which determines its flow or rheological properties, and the size and distribution of the particular gaseous bodies described herein.

With regard to the composition of the liquid phase, the physical properties and concentration of the polymer are of importance. Any polymer may be used which can be dissolved in the liquid medium containing the polar solvent and which will form a solution having a consistency or flow characteristics effective to retain the gaseous bodies in suspension without gelation, i.e., without solidifying the mass, or otherwise increasing its viscosity to the point where it cannot be poured as a liquid or does not drain smoothly from the walls of a suitable container.

Solutions comprising the polymers which are effective to permit the formation of and restrain the described gaseous bodies from rising to the surface of the liquid for a prolonged period of time have a practical yield point, as indicated by the presence of a Bingham yield value estimated from a flow curve. The flow curve is obtained by plotting the stress exerted at varying shear rates of the same solution of the polymer using a suitable viscometer. By extension of the straight-line portion of the flow curve to intercept the stress axis, a Bingham yield point is indicated which serves as an index of the point at which the material will substantially flow and below which it will not substantially flow. In the instant invention, this practical yield strength acts as a restraining force which overcomes the inherent buoyant forces of the gas bodies normally tending to impel them upwardly.

The minimum concentration of said polymer should be sufficient therefore to impart a yield point effective to overcome the inherent buoyant forces generated by the gaseous bodies and maintain them in suspension, and preferably in a substantially immobile state to the naked eye, for a prolonged period of time. In general, the maximum concentration of the polymer is determined by the necessity for pourability of the liquid. The term "pourable" as used herein refers to the ability of the product to flow as a liquid under gravity at normal room temperatures (e.g. about 20° C.) from a narrow-mouthed, smooth-walled container, preferably from a glass bottle having an approximate diameter of one inch or less at the narrowest part. In the event that an excessive amount of the polymer is employed, the product is converted to a jelly, paste-like or even solid mass so as to destroy the requirement for pourability.

The liquid product will be contained preferably in a smooth-walled transparent glass bottle which permits observation of the attractive sparkling appearance and enables pouring of the product. Containers composed of any suitable material, such as transparent (including translucent) plastics, may be used also. The containers may be adapted to discharge or dispense the product by any suitable means other than pouring of the product. Thus, the product may be utilized in a plastic squeeze-bottle or tube, or in a container having a valve which controls dispensing of the liquid from the container.

The desired draining characteristics are obtained by the use of the suitable concentration of the polymer so that the liquid phase has the proper flow characteristics. Upon pouring a portion of the contents from a suitable transparent container and then resting the container on a horizontal surface, the remaining liquid should drain from the walls surrounding the headspace in a smooth, oily and substantially continuous film. If a product is a jelly-like mass having a fibrous or rough texture with excessive viscosity or insufficient mobility, it tends to drain so as to leave thick, stringy, ropy discontinuous layers or blobs of material on the transparent walls. Such an effect detracts markedly from the appearance of the product and destroys the esthetic effect, in addition to reducing the amount obtainable from the container and impairing the pouring qualities of the product.

The flow characteristics influence the shape of the gaseous bodies. The yield strength of the liquid should be within the range which permits the gaseous bodies to assume a globular or substantially spheroidal shape. Where the concentration of the polymer is too high so that the product is jelly-like rather than a smooth liquid, the excessive yield strength prevents deformed bodies from becoming spheroidal so that they may be irregular in shape depending upon their size. Where the yield strength is within the proper range, the bodies assume the characteristic globular shape which is desired for the sparkling appearance, although a proportion of the bodies may temporarily be ellipsoidal in shape due to shaking or pouring of the product or other local pressures, but such bodies will tend to assume a substantially spheroidal shape upon standing.

The required flow characteristics are observable phenomena and are obtainable by the use of a suitable proportion of the polymer in the liquid phase, such as up to about 5% by weight, and preferably from about 0.05 to 1% by weight of the composition, depending upon the specific polymer used and the other ingredients present therein.

As an illustration of variations in flow characteristics, three liquid compositions were prepared which are herein described as compositions A, B and C. Composition B corresponds to the formulation of Example I described hereinafter having approximately 0.3% of a carboxyvinyl polymer, and is free from the gas bodies so as to determine the flow characteristics of the surrounding liquid phase. Composition A is similar but has one-half (0.15%) of the amount of the same polymer and composition C has twice (0.6%) the polymer content. These compositions were subjected to viscosity measurements using a Brookfield rotational viscometer. FIGURE 3 sets forth the flow curves of these three compositions. As indicated, compositions A and B were tested using a No. 2 spindle and are on the same graph. Composition C was tested using a No. 4 spindle and its flow curve is on a separate graph. With the Brookfield viscometer, spindles of different sizes are used when testing liquids in different viscosity ranges. It is apparent from the flow curves that the three compositions have Bingham yield values, and the slopes of the curves are an indication of the mobility of the compositions after flow has been initiated. The calculated data on yield value and slope are as follows:

TABLE I

| Flow Characteristic [1] | Composition | | |
|---|---|---|---|
| | A | B | C |
| Bingham yield value (Deflection units) | 12 | 49 | 11 |
| Bingham slope (r.p.m./deflection unit) | 2 | 0.5 | 5 |

[1] Using Brookfield Model LVT5X, full scale torque (100 scale divisions: 3368.5 dyne-cm.) No. 2 spindle used on compositions A and B and No. 4 spindle used on composition C.

The corresponding viscosities of the composition at the various rates of shear are calculated as follows:

TABLE II

| Rate of Shear | Viscosity of Composition in Brookfield Centipoises | | |
|---|---|---|---|
| | A | B | C |
| 0.3 | 32,500 | 167,500 | 700,000 |
| 0.6 | 18,750 | 82,500 | 380,000 |
| 1.5 | 9,400 | 44,000 | 176,000 |
| 3.0 | 5,650 | 25,650 | 100,000 |
| 6.0 | 3,500 | 15,250 | 57,500 |
| 12.0 | 2,250 | 9,650 | 33,750 |

With regard to the pourability of these test solutions, composition B is considered to have optimum pouring qualities as a fairly viscous fluid flowing in a slow stream from a narrow-mouthed container. Composition A is considerably more fluid as noted by its decreased viscosity in comparison to composition B. Compositions A and B drain quickly in a smooth, oily continuous film from the walls of a glass container. Composition C is, in the form of large droplets, pourable within a few seconds from a container having a two inch mouth and drains in a smooth and oily manner, but more slowly and tends to leave a heavier film.

In designing a product in accordance with the teachings herein, the characteristics with respect to the size and distribution of the gaseous bodies may vary over a range to give the desired optical effect which will be maintained upon aging.

As indicated, the dispersed gaseous bodies should have a substantially globular or spheroidal shape when viewed by the naked eye and will appear to be transparent in a clear liquid phase so as to give a sparkling appearance when viewed before a light. Where the gaseous bodies are too small, they will appear as mere specks or as a flocculent precipitate or haze to the naked eye. Such condition cannot convey the impression to an observer of a sparkling effect.

The size of the gaseous bodies should be correlated with the flow characteristics of the liquid medium so that they are suspended therein. Such effects may be illustrated by measurements of the velocities of rise of gaseous bodies in the above liquid compositions A, B and C. With composition A which had the lowest yield strength and a viscosity of about 32,500 centipoises at 0.3 r.p.m., it was found that gas bodies having diameters of about 2–4 millimeters rose quickly and even smaller gaseous bodies disappeared within about one month. In contrast thereto, composition C, which had the highest yield strength and a viscosity of about 700,000 centipoises at 0.3 r.p.m., retained gaseous bodies of similar diameters in suspension to the extent that they did not exhibit any significant upward movement when examined similarly. It is considered desirable that the flow characteristics of the solution, using the same carboxyvinyl polymer or polymers having similar properties, should be selected within the range of flow characteristics exhibited by composition A on the one hand and composition C on the other so as to achieve pourability of the product and sufficient stability of the gaseous bodies on aging.

As an example of the preferred product, composition B having intermediate flow characteristics was prepared with a dispersion of gaseous bodies similar to FIGURE 1 in the drawing having diameters up to about 4 millimeters. Such product maintained the gaseous bodies in suspension and exhibited the sparkling effect after several months aging. Examination by macrophotographic methods of a variety of gas bodies having diameters within the range of about 0.75 to 1.6 millimeters disclosed that they exhibited upward velocities of the order of $1.5 \times 10^{-3}$ millimeters per day. Such velocities are equivalent to a rise of about one millimeter per year.

The overall sparkling appearance of the product should be maintained for a period of at least about three months as a practical consideration with respect to the possible shelf life of the product in a bottle. If the gaseous bodies rise at too fast a rate, a large part of the product will be devoid of them relatively quickly. Accordingly, the product should contain an appreciable proportion of gaseous bodies which do not rise at a rate in excess of about one millimeter per day, and preferably at a velocity from apparent zero to about 0.5 millimeter per day.

The minimum size of the gaseous bodies is a consideration also with respect to their stability in the liquid, in addition to the requirement that they are sufficiently large to convey the desired optical effect. The gaseous bodies which are relatively small are under higher internal pressure than larger bodies and there is a tendency for the smaller bodies to decrease in size by diffusion of gas into the liquid medium over a period of time and eventually disappear. For example, gaseous bodies composed of compressed air having diameters of the order of less than about 0.5 millimeter in composition B tended to disappear after a period of several months, whereas examination of larger gas bodies of the order of 0.7 to 1.5 millimeters showed that they remained in suspension with only minor, if any, apparent changes in size. This effect is minimized by the use of gases which are not appreciably soluble in the liquid medium.

As indicated, the minimum diameter of a number of the gaseous bodies should be at least about 0.1 millimeter, and preferably at least about 0.5 millimeter, depending upon the gas employed, in order to convey the desired optical effects. The maximum size of the gas bodies will be less than about 8 millimeters in diameter usually, and preferably up to about 5 millimeters, and is integrated with the yield value so that they do not rise readily to the surface. It is preferred that a sufficient number of the gas bodies do not rise at a rate greater than about 0.25% per day of the height of the liquid in the container which would insure that the bulk or substantial portion of the liquid has the gaseous bodies over a period of at least about three months. It will be understood that the sizes of the gas bodies will be correlated with the flow properties of the liquid phase as previously described.

The distribution (including population) of the gaseous bodies is variable depending upon their size and the optical effect desired, but should be sufficient to impart to an observer the effect that the gaseous bodies are present by design or predetermination in order to highlight the product. It is preferred, therefore, that the gas bodies be initially dispersed in substantially all sections or general areas of the liquid phase. The distribution may be random or uniform throughout the liquid phase as desired. In general, the product contains an average of at least about one gaseous body per cubic centimeter of liquid. More particularly, it is desired that the average number of gaseous bodies be of the order of at least about two per cubic centimeter, and preferably at least about five bodies per cc. In contrast, the distribution of only a few bodies at random will not convey the overall sparkling effect but will appear merely as some entrained bubbles or holes, particularly if the product is highly viscous. The maximum population can be varied as desired within a wide range provided that the bodies are not packed so densely that the product appears as a foam or emulsion. The liquid should be transparent (including translucent) and the gas bodies should appear to be discrete and generally not contiguous to one another.

With regard to the chemical composition of the product, it comprises a polymer dissolved in the polar solvent which imparts the foregoing qualities to the product. In general, such polymers are synthetic, mucilaginous substances, which preferably contain carboxylic salt groups. It is preferred to employ cross-linked polymers which are produced by the polymerization or intermolecular reaction of two or more different monomers containing polyfunctional groups. The term polymer includes therefore copolymers.

Suitable examples of such polymers are disclosed in British Patent specification No. 799,951, published August 13, 1958, and U.S. Patent No. 2,798,053, granted July 2, 1957. The polymers disclosed therein are compositions comprising a cross-linked interpolymer of (a) a mono-olefinic monomeric material comprising at least 25% by weight of a monomeric olefinically-unsaturated carboxylic acid containing at least one activated carbon to carbon double bond such as acrylic acid, and (b) from about .01 to about 10% by weight of a polyunsaturated cross-linking agent containing a plurality of polymerizable vinyl or crotyl groups such as a polyalkenyl polyether of a polyhydric alcohol. More particularly, the preferred interpolymers are derived from a mixture of acrylic acid and a polyether of sucrose in which the hydroxyl groups which are modified are etherified with at least two allyl groups per sucrose molecule. A specific material thereof contains about 97.5 to 99.8% by weight of acrylic acid and about 2.5 to 0.2% by weight of a monomeric polyether of sucrose in which the hydroxyls are etherified with at least two, and preferably about five to about six allyl groups per sucrose molecule.

The carboxylic acid polymer should be at least partially neutralized in the polar solvent to form a suitable base in accordance with the present invention. Such carboxyvinyl polymers are available commercially in the free acid form and neutralized as required to develop the desired flow characteristics. A wide variety of bases can be used to neutralize the carboxylic acid groups of the polymer to provide satisfactory final products, usually to the extent of at least about 10% neutralization. Among the preferred neutralizing agents are ammonium hydroxide, alkylolamines such as triethanolamine and monoethanolamine; and alkali metal bases such as sodium and potassium hydroxide and carbonate. Other neutralizing agents or materials are amines such as triethylamine, triamylamine and the like. The selection of a particular salt will be influenced in part by the polar solvent medium desired since some neutralizing agents form polymeric salts which are soluble in some systems, but insoluble in others. Thus the ammonium, alkali metal, certain alkylolamine and lower aliphatic amine salts are soluble in polar mediums such as water, and various aliphatic alcohols such as glycerine, ethylene glycol and propylene glycol. It is possible to use solvents in part in which the polymeric salts are not soluble provided a sufficient quantity of a polar co-solvent is present in which the polymer is soluble.

Another type of suitable water-soluble resinous material is an ethylene-maleic anhydride copolymer. It is supplied usually in anhydride form which can be hydrolyzed by heating the resin in water, and neutralizing with said neutralizing agents to the desired extent as above described.

It is preferred to have an aqueous solvent medium in the preparation of a cosmetic composition. The water is employed usually in major proportion and other materials such as the lower aliphatic water-miscible alcohols e.g. ethyl alcohol and isopropyl alcohol, may be employed in desired amount.

In the preparation of the cosmetic product, the pH may be adjusted as desired within a wide range provided the desired flow properties of the liquid are maintained. In general, the cosmetic liquids comprising an aqueous phase will have a pH from about 4 to 9, and usually from about 5.5 to 8.5, so as to be compatible with human tissue. It is preferred that the liquid be slightly acidic since the mantle of the skin and the hair are moderately acidic in nature.

The gas bodies may be formed of any suitable gas which is substantially inert. In general, the gas should not have a substantial solubility in the solvent medium so that the gas bodies do not readily dissolve into the surrounding liquid. The solubility of the suitable gases in water is usually a maximum of about 3.1% at 20° C. and atmospheric pressure. Such gases have been employed satisfactorily in products of the present invention. Examples of suitable inert inorganic gases are oxygen, nitrogen, compressed air and the like. If desired, any other suitable gas may be used such as sulfur hexafluoride and perfluorocyclobutane.

The gaseous bodies may be formed in the liquid solvent medium in any suitable manner to produce bodies of the desired volume and distribution. One method comprises incorporating a sufficient amount of the gas while agitating the liquid medium so as to disperse the gas in bodies of suitable size throughout the liquid phase. The extent of the agitation can be adjusted for liquids of different flow properties. Thus, the liquid phase may be mechanically stirred or whipped in the presence of a suitable gas, the degree of agitation usually determining the size and amount of the gas bodies formed therein. Alternatively, the gas may be incorporated in the liquid in the form of relatively large bodies which can be broken down to bodies of smaller size by suitable agitation or similar shearing means.

An embodiment of this invention comprises contacting the liquid medium with a flowing stream of the gas so as to form bodies of predetermined size and population. Thus, the gas may be injected into the liquid solvent medium through a nozzle or plurality of nozzles having one or more orifices, the diameter of which will influence the size of the gas bodies. For example, orifices of greater diameter will produce larger gas bodies than smaller orifices under otherwise similar conditions.

An apparatus has been developed for manufacture of products of this invention which is effective in controlling the size and population of the gas bodies in the liquid medium within a broad range. The apparatus comprises a passageway for the liquid solvent medium positioned above a horizontally-disposed plate in the passageway and spaced from the walls so as to permit the liquid to flow off the plate, the plate having a plurality of orifices through which the gas is fed under pressure. The liquid medium is pumped through a narrow opening and flows directly upon the plate containing the orifices (which is known as a spinnerette). The fluid flowing adjacent to the spinnerette entrains the gas in the form of bodies and is permitted to flow off the spinnerette and be recovered below. The size and distribution of the gas bodies may be controlled by appropriate adjustment of the flow of the liquid or the gas, or by the thickness of the film of the liquid as it flows over the facing containing the orifices. A typical apparatus which produces a product similar to FIGURE 1 comprises a spinnerette having a number of small orifices of about 0.08 mm. in diameter and connected to a pressure cylinder of gas, a tube or passageway having an outlet of about 3.2 mm. and centered above the spinnerette, and the distance between the outlet and the face of the spinnerette being about 3.2 to about 6.4 mm. A tube receiving the liquid containing the gas bodies is bent upwardly at about an angle of 45° to induce "folding" or mixing of the product.

An embodiment of this invention relates to the inclusion of an ultra-violet absorber in the liquid product. It has been found that the product tends to become less viscous and a number of the gaseous bodies tend to disappear upon aging in the presence of sunlight. The decrease in population of the gaseous bodies over a long period of time due to the effect of sunlight appears to be primarily in the portion of the liquid adjacent to the headspace. The presence of the ultra-violet absorber inhibits the effect of sunlight and insures a more stable suspension of gas bodies.

The ultra-violet absorbers are highly fluorescent in ultra-violet light or light rays of wave lengths from about 2,000 to 3,600 Angstrom units and should be selected so as to be compatible and soluble in the liquid medium. In general, they are substantially invisible when applied to human tissue. It is preferred to employ ultra-violet absorbers having a 2-hydroxybenzophenone group or nucleus, and particularly 2,2',4,4'-tetrahydroxybenzophenone. Another ultra-violet absorber is 2,4-dihydroxybenzophenone. These materials are alcohol-soluble and the liquid product should contain a sufficient amount of an alcohol to solubilize these agents when employed in an aqueous medium. Examples of other known ultra-violet absorbers which can be used are benzoyl resorcinol and various coumarine, acridine, benzimidazole, benzothiazole derivatives and the like. In the event that the liquid medium is colored or tinted to a particular color such as pink, blue or yellow using non-toxic dyes which are susceptible to fading in sunlight, the incorporation of an ultra-violet observer will tend to inhibit fading of the color of the composition. The amount of the ultra-violet absorber employed is variable, but will be a very small amount of the order of about .005 up to 1% by weight.

The cosmetic preparation should contain a cosmetic active ingredient intended to be applied to or contact the skin, hair or any other portions of the body. It is intended to cleanse, beautify, alter the appearance or otherwise beneficially affect the area of application in known manner. Examples of suitable types of active ingredients are surface-active agents, sun-tanning ingredients, anti-bacterial or deodorant agents, skin-freshening agents, hair grooming agents and the like. It is understood that the active ingredient will be selected and used in an amount which will not substantially adversely affect the appearance of the product. Some of the compositions formulated thereby are cosmetic lotions such as skin cleansers and shaving lotions; mouthwashes (e.g., suitable anti-bacterial agent in aqueous alcohol); suntan preparations (e.g., U.V. absorber in aqueous alcohol); bubble-bath or shampoos (e.g., suitable amount of detergent in water); and similar cosmetic preparations (including toiletry and detergent compositions).

A preferred embodiment relates to a transparent liquid cosmetic lotion which contains a minor amount of a surface-active agent dissolved in the aqueous phase for cleansing purposes. It is employed in a minor amount up to about 10%, and usually up to about 5% by weight of the formulation. It is preferred to use an amount from about 0.1 to 3% by weight.

It is preferred to employ a water-soluble non-ionic detergent, such as the organic polyalkylene oxide-containing surface-active agents. Such materials generally are the water-soluble condensates of polyalkylene oxide containing from at least about 5, and usually up to 100 alkylene oxide groups, with a hydrophobic organic group, the latter group containing at least about 5 and usually about 8 to 30 carbon atoms. A particularly effective agent to use is a polyalkylene oxide ether of a higher aliphatic alcohol. Suitable fatty alcohols having a hydrophobic character, and preferably 8 to 22 carbons, are lauryl, tridecyl, myristyl, cetyl, stearyl and oleyl alcohols which may be condensed with an appropriate amount of ethylene oxide, preferably about 6 to 30 moles. A typical product is a fatty alcohol of 12 to 14 carbons condensed with about 10 moles of ethylene oxide.

Further suitable non-ionic materials are the polyalkylene oxide condensates of alkyl phenol such as the polyglycol ethers of alkyl phenol wherein the alkyl group has about 6 to 20 carbons and about 5 to 30 moles of ethylene oxide, specific examples of which are Igepal CO–630 and 710. Other examples are the polyoxyalkylene esters of organic acids such as the higher fatty acids or tall oil acids and the like. These polyglycol esters will usually contain about 8 to 30 moles of ethylene oxide and about 8 to 22 carbons in the acyl group.

Various ionic surface-active agents may be used provided the amount employed is compatible with the liquid system. Examples thereof are the higher alkyl sulfate detergent, higher fatty acid monoglyceride sulfates and higher alkyl benzene sulfonate detergents such as the sodium, potassium and ethanolamine salts thereof.

If desired, the lotion can contain a lower aliphatic alcohol which is water-miscible as part of the aqueous solvent medium for special effects. For example, there may be used a proportionate amount of ethyl alcohol, usually less than about 50% by weight, to add astringent or skin-freshening properties to the mixture if desired.

A preferred ingredient in the cosmetic lotion is a clarifying agent which is an aid in the maintenance of the transparency and clarity of the liquid phase. In the event that the solution contains an amount of the polymer which tends to make the solution have less clarity than desired, the use of a clarifying agent in a minor proportion will be desirable, such as from about 0.5 to 10% by weight. Any suitable clarifying agent may be employed since the desired effect is usually observable. It is preferred to employ a compound having a polyglycol group which is water-soluble. A suitable example is a mixed polyethylene oxide polypropylene oxide condensate with glycerine having an approximate molecular weight of 2,600 and known in the trade as polyglycol 15–200.

Various other materials may be incorporated in the composition provided that they are selected so as to be compatible therewith. It is preferred to employ an interpolymer of a vinyl alkyl ether, such as vinyl methyl ether, with maleic anhydride in a very small amount, such as .01 to 1% by weight. This material confers desirable properties to the composition since it enhances the slip and feel of the product when it is applied to the skin of the user.

Other materials may be added in suitable amount also as desired including coloring materials, perfume oils, Carbowaxes, menthol, hexachlorophene and the like.

The following specific examples are further illustrative of the nature of the present invention, but it is to be understood that the invention is not limited thereto. The amounts of the various ingredients are by weight unless otherwise indicated.

Examples I–III

COSMETIC LOTIONS

| Ingredients | I, percent | II, percent | III, percent |
|---|---|---|---|
| Part I: | | | |
| Polyglycol | 5.0 | 5.0 | 5.0 |
| Ethyl alcohol | 8.0 | 18.0 | 8.0 |
| Non-ionic surface-active agent | 2.0 | 2.0 | 2.0 |
| Perfume oil | 0.03 | 0.03 | 0.03 |
| Ultra-violet absorber (2% alcoholic solution) | 2.0 | 2.0 | 2.0 |
| Fatty Material | | | 1.0 |
| Part II: | | | |
| Unneutralized carboxyvinyl polymer [1] (1% solution) | 30.0 | 30.0 | 30.0 |
| Slip-improving agent (2% solution) | 6.0 | 6.0 | 6.0 |
| Water | 44.80 | 34.977 | 43.87 |
| Color | 0.2 | 0.023 | 0.13 |
| Part III: | | | |
| Ammonia | 0.184 | 0.184 | 0.184 |
| Water | 1.786 | 1.786 | 1.786 |

[1] Co-polymer of about 99% by weight of glacial acrylic acid and about 1% by weight of polyallyl sucrose in which the sucrose molecule has an average of about 5–6 allyl groups.

Composition I having about 10% alcohol is designed for use on normal skin particularly, whereas composition II having 20% alcohol is believed to have more pleasing effects on oily skin. Composition III differs from I in the inclusion of 1% of a fatty material, viz., monoester of coconut fatty acids and a polyethylene glycol having an average molecular weight of about 400, to improve the effect on dry skin. In the formulations, the polyglycol is a condensate of glycerine with ethylene oxide and propylene oxide having a molecular weight of about 2,600. The non-ionic surface-active agent is a fatty alcohol of 12–14 carbons condensed with about 10 moles of ethylene oxide, the slip-improving agent is a copolymer of methyl vinyl ether and maleic anhydride, and the ultra-violet absorber is 2,2',4,4'-tetrahydroxybenzophenone.

The compositions are prepared by weighing the ingredients of part I into a suitable vessel and mixing thoroughly to form a uniform solution. The ingredients of part II are mixed together and slowly added to part I with stirring to form a homogeneous solution. The addition of the concentrated ammonia as part III at least partially neutralizes the carboxyvinyl polymer, and the final solution has a pH of about 6.1.

A dispersion of gaseous bodies of nitrogen is formed in each liquid using the apparatus described above wherein the solution flows upon a spinnerette which injects the gas into the liquid. The products contain an appreciable proportion of gaseous bodies having diameters of about 0.5 mm. to 2 mm., though there are some larger gaseous bodies dispersed therein also. The products possess a sparkling effect when viewed before a light. This optical effect is still maintained after aging of the products for several months. The liquid products can be poured readily from a glass container having a mouth diameter of about 0.5 inch and drain from the walls in a smooth, oily manner.

The products are effective skin cleansing agents. The rubbing of a small portion of the products on the skin removes make-up products such as rouge, lipstick, and mascara readily. The preparations have the property of leaving the skin free from an undesirable greasy feeling and appearance so that new make-up may be applied readily without further cleansing.

Examples IV–VI

The formulation Example I is repeated using substantially the same procedure except that, in place of the nitrogen, there is employed separately sulfur hexafluoride, perfluorocyclobutane and oxygen as the gases. All of the resulting products exhibited satisfactory stability, flow characteristics, and a sparkling appearance.

Example VII

A similar product is made using the formulation of Example I except that, in place of the described carboxyvinyl polymer, there is used an equivalent amount of a resinous copolymer of ethylene and maleic anhydride. The resulting liquid is treated with compressed air in the same manner to obtain a product with the desired sparkling appearance due to the bodies of compressed air which are retained in suspension upon aging. The liquid products, when examined similarly with a Brookfield viscometer using a No. 2 spindle, has a Bingham yield value of 20, a Bingham slope of 0.8, and a viscosity of 61,500 Brookfield centipoises at a shear rate of 0.3 r.p.m.

Although the present invention has been described with reference to particular embodiments and examples, it will be apparent to those skilled in the art that variations and modifications of this invention can be made and that equivalents can be substituted for various ingredients without departing from the principles and true spirit of the invention.

Having described the invention, what is desired to be claimed by Letters Patent is:

1. A transparent liquid composition which comprises a transparent aqueous solvent containing a polymer dissolved therein in such concentration as to be pourable from a narrow-mouthed container and form a liquid phase having flow properties which include a Bingham yield value, and having dispersed therein discrete bodies of a gas normally having a maximum solubility in water of about 3.1% at 20° C. and atmospheric pressure, said flow properties of the surrounding liquid phase being sufficient to maintain said gaseous bodies in globular form and allow the draining of the liquid from the walls in a smooth, oily manner upon pouring of the product, said gaseous bodies having diameters of a desired size range within the limits of about 0.5 to 5 millimeters, the average number of bodies being at least about one per cubic centimeter of said liquid and distributed throughout the liquid phase as to impart a sparkling effect upon visual observation, the yield value of said liquid being controllable by variation in the concentration of said polymer in said solvent, said yield value being sufficient to retain said gaseous bodies in suspension and maintain said optical effect for a prolonged period of time.

2. A composition in accordance with claim 1 wherein said polymer contains carboxylic salt groups.

3. A composition in accordance with claim 1 which contains an ultra-violet absorber.

4. A composition in accordance with claim 1 which contains a water-soluble non-ionic surface-active agent.

5. A cosmetic composition in the form of a smooth transparent liquid which comprises a transparent aqueous solvent containing about 0.05 to 1% by weight of a cross-linked carboxylic salt-containing co-polymer dissolved therein in such concentration as to be pourable from a narrow-mouthed container and form a continuous liquid phase having a Bingham yield value and a viscosity within the range corresponding to about 32,500 to about 700,000 Brookfield centipoises at a shear rate of 0.3 r.p.m. and having dispersed therein discrete bodies of a gas normally having a solubility in water of up to about 3.1% at 20° C. and atmospheric pressure, said gaseous bodies having diameters of a desired size range within the limits from about 0.5 to 5 millimeters, the average number of bodies being at least about two per cubic centimeter of said liquid and distributed throughout the liquid phase as to impart a sparkling effect upon visual observation, the yield value of said gaseous bodies being controllable by variation in the concentration of said polymer in said solvent, said yield value being sufficient to retain said gaseous bodies in suspension and maintain said optical effect for a prolonged period of time.

6. A cosmetic composition in accordance with claim 5 wherein said polymer is a copolymer of acrylic acid and a polyallyl ether of sucrose.

7. A cosmetic composition in accordance with claim 5 wherein said polymer is a copolymer of ethylene and maleic anhydride.

8. A cosmetic composition in the form of a lotion in accordance with claim 5 having a pH from about 4 to 9 and containing an ultra-violet absorber having a benzophenone group and a water-soluble non-ionic surface-active agent dissolved in an aqueous alcoholic solvent medium.

9. The method which comprises preparing a liquid comprising an aqueous solvent having dissolved therein a polymer having a carboxylic salt-containing group in such concentration as to be pourable and form a liquid phase having a Bingham yield value, and injecting a compressed gas having a maximum solubility in water of about 3.1% at room temperature and atmospheric pressure in the form of a plurality of gas streams into the liquid while it is in a state of agitation to form a dispersion throughout the liquid phase of discrete, globular gaseous bodies having diameters of a desired size range within the limits of about 0.5 to 5 millimeters, the average number of bodies being at least about one per cubic centimeter of the liquid and distributed throughout the liquid phase as to impart a sparkling effect upon visual observation, the yield value of said liquid being controllable by variation in the concentration of said polymer in said solvent, said yield value being sufficient to retain said gaseous bodies in suspension and maintain said optical effect for a prolonged period of time.

10. A transparent liquid cosmetic composition which comprises a transparent aqueous solvent containing a carboxylic salt-containing copolymer dissolved therein in such concentration as to be pourable from a narrow-mouthed container and form a liquid phase having flow properties which include a Bingham yield value, said copolymer containing about 97.5 to 99.8% by weight of acrylic acid and about 2.5 to 0.2% by weight of a monomeric polyether of sucrose in which the hydroxyl groups are etherified with at least two allyl groups per sucrose molecule, and having dispersed therein discrete gaseous bodies of nitrogen, said flow properties of the surrounding liquid phase being sufficient to maintain said nitrogen gaseous bodies in globular form and allow the draining of the liquid from the walls in a smooth, oily manner upon pouring of the product, said gaseous bodies having diameters of a desired size range within the limits of about 0.5 to 5 millimeters, the average number of bodies being at least about one per cubic centimeter of said liquid and distributed throughout the liquid phase as to impart a sparkling effect upon visual observation, the yield value of said liquid being controllable by variation in the concentration of said polymer in said solvent, said yield value being sufficient to retain said gaseous bodies in suspension and maintain said optical effect for a prolonged period of time.

11. A transparent liquid cosmetic composition in accordance with claim 10 wherein said polymer contains about 99% by weight of acrylic acid and about 1% by weight of polyallyl sucrose in which the sucrose molecule has an average of about 5–6 allyl groups.

12. A transparent liquid cosmetic composition in accordance with claim 10 which contains a water-soluble non-ionic surface-active agent, perfume and an ultra-violet absorber in an aqueous alcoholic solution.

13. A cosmetic liquid composition which comprises a transparent aqueous solvent containing a water-soluble surface-active agent and a synthetic polymer dissolved therein in such concentration from the range of about 0.05 to 5% by weight as to be pourable from a narrow-mouthed container and form a liquid phase having flow properties which include a Bingham yield value, and having dispersed therein discrete bodies of a gas normally having a maximum solubility in water of about 3.1% at 20° C. and atmospheric pressure, said flow properties of the surrounding liquid phase being sufficient to maintain said gaseous bodies in globular form having diameters of a desired size range within the limits of about 0.5 to 5 millimeters, the average number of bodies being at least about one per cubic centimeter of said liquid and distributed throughout the liquid phase as to impart a sparkling effect upon visual observation, the yield value of said liquid being controllable by variation in the concentration of said polymer in said liquid, said yield value being sufficient to retain said gaseous bodies in suspension and maintain said optical effect for a prolonged period of time.

14. A cosmetic composition in accordance with claim 13 wherein said polymer is a cross-linked co-polymer and said liquid phase has a viscosity within the range corresponding to about 32,500 to about 700,000 Brookfield centipoises at a shear rate of 0.3 r.p.m.

15. A transparent liquid composition which comprises a transparent polar solvent containing a polymer dissolved therein in such concentration as to be pourable and form a liquid phase having flow properties which include a Bingham yield value, and having dispersed therein discrete, globular gaseous bodies having diameters of a desired size range within the limits of about 0.5 to 5 millimeters, the average number of gaseous bodies being at least about one per cubic centimeter of said liquid and distributed throughout the liquid phase as to impart a sparkling effect upon visual observation, the yield value of said liquid being controllable by variation in the concentration of said polymer in said liquid, said yield value being sufficient to retain said gaseous bodies in suspension and maintain said optical effect for a prolonged period of time.

16. A method for preparing a transparent liquid composition having a sparkling effect upon visual observation which is maintained for a prolonged period of time which comprises admixing a polar solvent with a polymer in such concentration as to be pourable and forming a transparent liquid phase having flow properties which include a Bingham yield value, dispersing sufficient gas into said liquid phase while agitating it and forming a dispersion throughout the liquid phase of discrete, globular gaseous bodies of nitrogen having diameters of a desired size range within the limits of about 0.5 to 5 millimeters, the average number of bodies being at least about one per cubic centimeter of said liquid and distributed throughout the liquid phase as to impart a sparkling effect upon visual observation, the yield value of said liquid being controllable by variation in the concentration of said polymer in said liquid, said yield value being sufficient to retain said gaseous bodies in suspension and maintain said optical effect for a prolonged period of time.

17. A method in accordance with claim 16 wherein said polymer is a synthetic cross-linked co-polymer present in a concentration from the range of about 0.05 to 5% by weight in a transparent aqueous solvent having a viscosity within the range corresponding to about 32,500 to about 700,000 Brookfield centipoises at a shear rate of 0.3 r.p.m., and said gas has a normally maximum solubility in water of about 3.1% at room temperature and atmospheric pressure.

18. A method in accordance with claim 17 wherein said polymer is a co-polymer of acrylic acid and a polyallyl ether of sucrose.

(References on following page)

References Cited in the file of this patent

UNITED STATES PATENTS

| | | |
|---|---|---|
| 2,778,737 | Du Bridge | Jan. 22, 1957 |
| 2,789,095 | Lindvig | Apr. 16, 1957 |
| 2,798,053 | Brown | July 2, 1957 |
| 2,803,615 | Ahlbrecht | Aug. 20, 1957 |
| 2,807,595 | Brown | Sept. 24, 1957 |
| 2,876,210 | Wynn | Mar. 3, 1959 |

FOREIGN PATENTS 873,891  Germany _____ Apr. 20, 1953

OTHER REFERENCES

Carbopol 934, B. F. Goodrich Co., 1957, pp. 1–12, 18, 20, 21.

Drug and Cos. Ind., 77: 2, August 1955, pp. 178, 179, 280, 281.